Feb. 9, 1932.    G. C. DAVIS    1,844,207
VALVE HOUSING
Filed Jan. 7, 1929
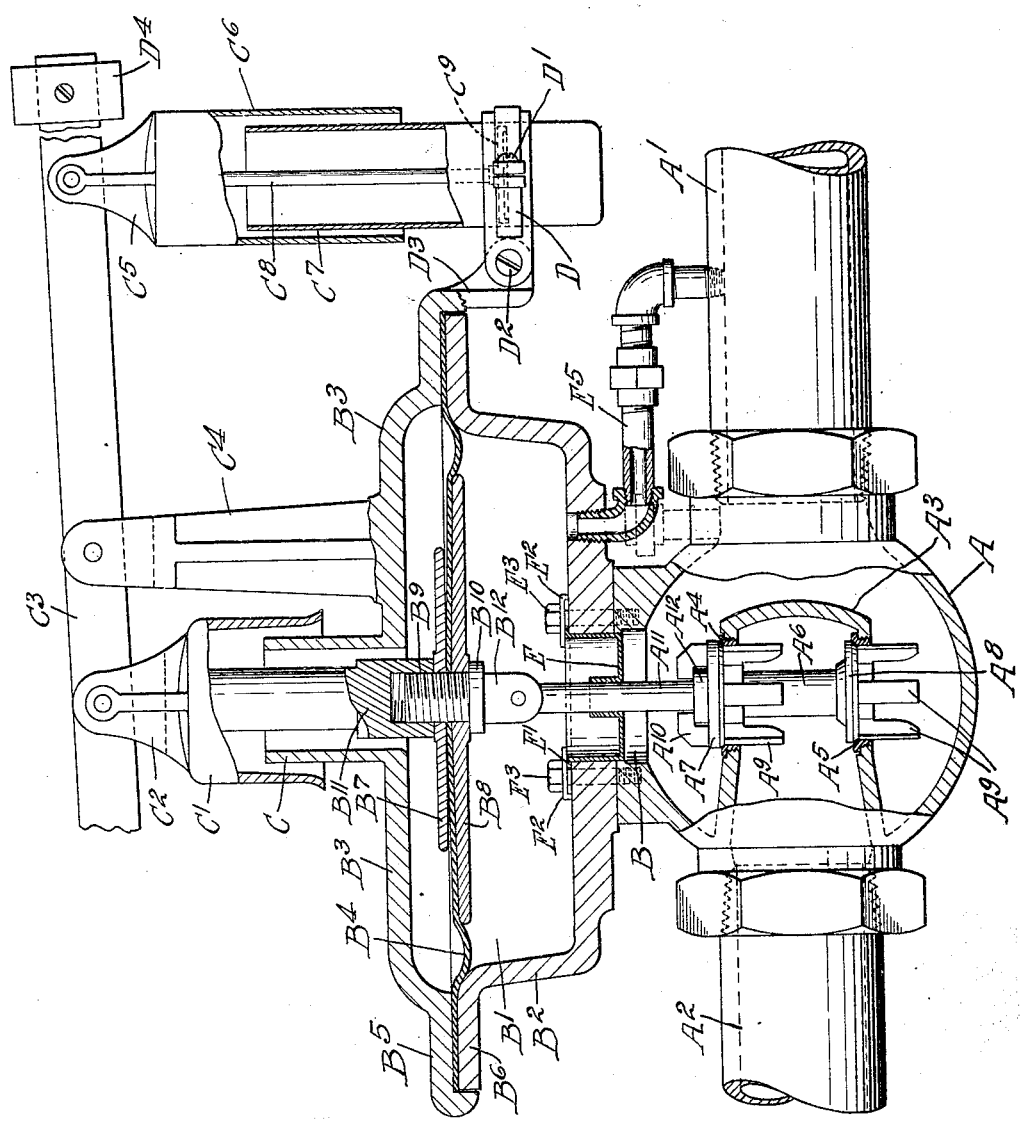
Inventor
George C. Davis
by Parker & Carter
Attorneys.

Patented Feb. 9, 1932

1,844,207

UNITED STATES PATENT OFFICE

GEORGE C. DAVIS, OF CHICAGO, ILLINOIS, ASSIGNOR TO G. M. DAVIS REGULATOR COMPANY, OF CHICAGO, ILLINOIS, A CORPORATION OF ILLINOIS

VALVE HOUSING

Original application filed March 26, 1926, Serial No. 97,510. Divided and this application filed January 7, 1929. Serial No. 330,806.

My invention relates to improvements in valve control means and is particularly adapted for use in connection with the type of valve wherein a flexible diaphragm is used associated with a pressure chamber which responds to variations in pressure in some part of the line to control or operate the valve. The present application is a division of co-pending application Ser. No. 97,510, filed on March 26, 1926.

One object of my invention is to provide means for limiting or controlling or supplementing the regulatory action of the pressure diaphragm herein described. Another object is to provide a limiting or damping means for controlling the movement of a lever associated with a pressure or expansion diaphragm. Other objects will appear from time to time in the course of the specification and claims.

My invention is illustrated more or less diagrammatically in the accompanying drawing which is a section through the valve and housing illustrating a dash pot partially in vertical axial section.

Like parts are indicated by like characters throughout.

A is a valve housing communicating at one end with an intake pipe $A^1$ at the other end with an exhaust pipe $A^2$. $A^3$ is a globe contained within the housing and having valve seats $A^4$ $A^5$ through which gas or air or liquid may pass from the intake to the outlet side of the valve housing. $A^6$ is the valve barrel adapted to extend through the valve seats $A^5$ $A^4$ and carry valve discs $A^7$ $A^8$ with guiding fingers $A^9$ adapted to guide the valve disc members toward and from the seats. $A^{10}$ is a yoke on the valve in loose engagement with a valve stem $A^{11}$ provided with a head $A^{12}$ to engage the yoke.

The valve stem $A^{11}$ extends up through an aperture B at the top of the valve housing into the pneumatic control chamber $B^1$ which is located in a housing $B^2$ having a cover $B^3$ and bolted onto the valve housing A so that an opening in the wall of the housing $B^2$ is in register with the opening B. $B^4$ is a diaphragm held at its edges between flanges $B^5$ $B^6$ on the cover and housing. This diaphragm is reinforced by plates $B^7$ $B^8$ slidable on a stud $B^9$ and clamped against the shoulder $B^{10}$ to compress the diaphragm by means of the threaded connecting rod $B^{11}$. The valve stem $A^{11}$ is pinned between the ears $B^{12}$ on the stud $B^9$.

The cover $B^3$ is open to permit the member $B^{11}$ to project outwardly above the diaphragm. A flange C surrounds this opening and projects upwardly from the cover. Associated with the member $B^{11}$ is a bell $C^1$ which extends downwardly outside the flange C and in all positions extends down below the top of the flange. This bell carries the member $B^{11}$ and terminates in a yoke $C^2$ pivoted on the lever arm $C^3$ which arm in turn is pivoted on a fulcrum arm $C^4$ on the cover $B^3$ and carries at its other end a yoke $C^5$ having a bell $C^6$ extending down and enclosing the upper end of a dash pot $C^7$, $C^8$ being a dash pot piston rod extending down from the yoke $C^5$ within the bell $C^6$ and carrying the piston $C^9$ slidable in the dash pot $C^7$.

The dash pot $C^7$ is longitudinally adjustable in a split ring D, which ring may be clamped on the dash pot by means of a clamp screw $D^1$. This ring is pivoted at $D^2$ on an arm $D^3$ carried by the cover $B^3$ so that the dash pot is given the necessary reciprocating movement to compensate for the movement of the lever $C^3$. An adjustable weight $D^4$ is carried by the lever $C^3$.

Experience shows that when gas is drawn through the valve at a rapid rate of speed, if the opening between the valve housing and the diaphragm housing is unobstructed, there is a tendency of the pressure in the diaphragm housing to be reduced below the pressure in the valve housing as a result of the ejector effect of the rapidly moving gas and thus the adjustment for the diaphragm movement will vary as the gas velocities vary even though the actual gas pressure may not vary. In order to prevent this, a fixed diaphragm E is inserted in the throat between the valve housing and the diaphragm housing. This fixed diaphragm comprises a cup-like member flanged at $E^1$ and held in place by clips $E^2$ associated with the cap screws $E^3$ which hold the two diaphragms together. This cap is perforated to permit passage of the valve stem $A^{11}$. This sleeve is in working contact with the valve stem, the contact being sufficiently light so that no appreciable friction is set up but such that air or gas circulation between the two chambers is minimized and the ejector effect completely dissipated. $E^5$ is a pipe leading from the interior of the diaphragm housing B to the pipe $A^1$ so that the pressure in the diaphragm housing is the same as the pressure in the intake pipe.

This arrangement of diaphragm in the throat between the diaphragm housing and the valve housing and the protecting mantle or bell protecting the open mouth or surface of the diaphragm and the dash pot though illustrated here as applied to a casing head regulator may be used either separately or in conjunction with many different valve arrangements and particularly the bell and housing for the diaphragm may be used in connection with any valve arrangement or mechanism where the valve is exposed to the elements or dust, dirt and the like.

I claim:

1. In combination with a valve controlling diaphragm and housing thereabout, a lever pivoted adjacent said diaphragm, a connection between said diaphragm and said lever including a stem outwardly projecting from said diaphragm, an extension of said housing about said stem, a dash pot cylinder, a plunger penetrating said dash pot, secured to said lever, and bells, associated with said lever about said dash pot cylinder and about said extension of said housing.

2. In a device for controlling the flow of a fluid, a valve, and a valve controlling diaphragm, a stem projecting outwardly from said diaphragm, a lever to which said stem is pivoted, a dashpot having an open top, a dashpot piston rod projecting outwardly therefrom, and operatively secured to said lever at a point spaced along said lever from its engagement with said stem, and a bell carried by the lever and enclosing but out of contact with the open end of the dashpot.

3. The structure of claim 2 characterized by the employment of a housing about said diaphragm, the lever and dashpot being exterior to said housing.

4. The structure of claim 2 characterized by the employment of a housing about said diaphragm, a lever abutment positioned upon said housing, the lever being pivoted to said abutment intermediate the connections between the lever and the diaphragm stem and the dashpot piston.

5. The structure of claim 2 characterized by the employment of a housing about said diaphragm, and an extension from said housing about the diaphragm stem, and a bell carried by the lever and enclosing but out of contact with said extension.

6. In a device for controlling the flow of a fluid, a valve and a valve controlling diaphragm, a lever pivoted adjacent said diaphragm, a connection between said diaphragm and said lever, a dashpot and a connection between said dashpot and said lever, and a fixed pivot abutment to which said lever is pivoted intermediate its connection with the diaphragm and dashpot.

7. The structure of claim 6 characterized by the employment of a housing about said diaphragm, the dashpot being mounted on said housing.

8. The structure of claim 6 characterized by the employment of a housing about said diaphragm, the dashpot being adjustably mounted upon said housing.

Signed at Chicago, county of Cook and State of Illinois, this 2nd day of January, 1929.

GEORGE C. DAVIS.